US006642516B1

(12) United States Patent
Hansen et al.

(10) Patent No.: US 6,642,516 B1
(45) Date of Patent: Nov. 4, 2003

(54) APPARATUS AND METHOD OF LASER DISSOCIATION FOR MASS SPECTROMETRY

(75) Inventors: Stuart C Hansen, Palo Alto, CA (US); Christian A. Le Cocq, Menlo Park, CA (US); Gangqiang Li, Palo Alto, CA (US); Scott W Corzine, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/322,955

(22) Filed: Dec. 18, 2002

(51) Int. Cl.[7] ......................... H01J 49/00; G01N 24/00; B01D 59/00; B01D 59/44

(52) U.S. Cl. ....................... 250/288; 250/281; 250/282; 250/286; 250/287; 250/289

(58) Field of Search ................................. 250/281, 282, 250/283, 284, 285, 286, 287, 288, 289, 290, 291, 292, 294

(56) References Cited

U.S. PATENT DOCUMENTS 5,998,215 A * 12/1999 Prather et al. .............. 436/173
6,423,966 B2 * 7/2002 Hillenkamp et al. ........ 250/288

* cited by examiner

*Primary Examiner*—John R. Lee
*Assistant Examiner*—David A. Vanore

(57) ABSTRACT

Mass spectometer system and method of use are disclosed. Briefly described, one embodiment of the mass spectrometry system, among others, includes a radio frequency multipole assembly, an inner structure, and a laser diode array system. The inner structure has an outside, an inside, and an opening. The inner structure substantially surrounds the radio frequency multipole assembly. The laser diode array system is disposed on the outside of the inner structure adjacent the side opening such that laser radiation emitted from the laser diode array system travels through the side opening.

25 Claims, 6 Drawing Sheets

APPARATUS AND METHOD OF LASER DISSOCIATION FOR MASS SPECTROMETRY

BACKGROUND

Mass spectrometry systems are analytical systems used for quantitative and qualitative determination of the compositions of materials, which include chemical mixtures and biological samples. In general, a mass spectrometry system uses an ion source to produce electrically charged particles (e.g., molecular or polyatomic ions) from of the material to be analyzed. Once produced, the electrically charged particles are introduced to the mass spectrometer and separated by mass analyzer based on their respective mass-to-charge ratios. The abundance of the separated electrically charged particles are then detected and a mass spectrum of the material is produced. The mass spectrum is analogous to a fingerprint of the sample material being analyzed. The mass spectrum provides information about the mass-to-charge ratio of a particular compound in a mixture sample and, in some cases molecular structure of that component in the mixture.

For determining molecular weight of a compound, mass spectrometry systems employing a single mass analyzer are widely used. These analyzers include a quadrupole (Q) mass analyzer, a time-of-flight mass analyzer (TOFMS), ion trap (IT-MS), and etc. For more complicated molecular structure analysis, however, tandem mass spectrometers (Tandem-MS or MS/MS) are often needed. Tandem mass analyzers typically consist of two mass analyzers of the same or of different types, for instance TOF-TOF MS or Q-TOF MS. In a tandem MS analysis, ionized particles are sent to the first mass analyzer and an ion of particular interest is selected. The selected ion is transmitted to a dissociation cell where the selected ion is fragmented. The fragment ions are transmitted to the second mass analyzer for mass analysis. The fragmentation pattern obtained from the second mass analyzer can be used to determine the structure of the corresponding molecules.

For example, in a triple quadrupole mass spectrometer an ionization source produces a plurality of parent ions. The first quadrupole mass analyzer is used to select a particular parent ion. Then, the selected parent ion is dissociated into daughter ions in the second quadrupole via photodissociation and/or collisionally induced dissociation. Subsequently, the third quadrupole mass analyzer is used to separate the daughter ions based on their respective mass-to-charge ratios. The resulting mass spectrum can be used to identify the daughter ions, which can be useful in identifying the structure of the selected parent ion.

In the example described above, the second quadrupole can be used as a collision cell to facilitate collision induced dissociation of the selected parention. When the parent ions collide with a background gas (normally an inert gas such as argon), a portion of the translation energy of the parent ions is converted into activation energy that is sufficiently high to break certain molecular bonds. The fragment pattern produced characterizes the original molecule and provides information about its structure.

In the example described above, a laser can be used to photodissociate the parent ions in the second quadrupole instead of collisions with gas molecules. Current photodissociation techniques use a cross-directed laser beam and a complex mirror system or an on-axis directed laser beam to create a high photon flux to dissociate the molecular ions. However, these photodissociation techniques require expensive high power lasers (e.g., $CO_2$ laser). Cross-directed laser beam techniques require precision mirror alignment, which can be expensive and time consuming to achieve. On-axis directed laser beam techniques are problematic because of significant ion loss.

Thus, there is a need in the industry for a mass spectrometry system that uses a photodissociation technique that overcomes at least these disadvantages.

SUMMARY OF THE INVENTION

Embodiments of the present invention provide for mass spectrometry systems and methods of use. Briefly described, one embodiment of the mass spectrometry system, among others, includes a radio frequency multipole assembly, an inner structure, and a laser diode array system. The inner structure has an outer surface, an inner surface, and an opening. The inner structure substantially surrounds the radio frequency multipole assembly. The laser diode array system is disposed on the outer surface of the inner structure adjacent the opening such that laser radiation emitted from the laser diode array system travels through the opening.

Embodiments of the present invention also include methods for dissociating an ion. In this regard, one embodiment of such a method, among others, includes producing an ion and focusing the ion into a dissociation cell/laser diode array system. The dissociation cell/laser diode array system includes a radio frequency multipole assembly, a structure that substantially surrounds the radio frequency multipole assembly and a laser diode array system disposed on the outer surface of the structure. The method also includes producing laser radiation with a laser diode array system and photodissociating the ion.

Other systems, methods, features, and advantages of the present invention will be or become apparent to one with skill in the art upon examination of the following drawings and detailed description. It is intended that all such additional systems, methods, features, and advantages be included within this description, be within the scope of the invention, and be protected by the accompanying claims.

BRIEF DESCRIPTION OF THE DRAWINGS

Aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present invention provide for dissociation cell/laser diode array systems that can be used in a mass spectrometry system that can overcome some of the disadvantages discussed above. The dissociation cell/laser diode array system includes one or more laser diode array systems to produce laser radiation. The laser diode array system is less expensive than equivalent laser systems (e.g., $CO_2$ gas laser systems). The laser diode array system includes a laser diode array. The laser diode arrays are compact and provide a high density photon flux with power supply efficiencies approaching fifty percent. In this regard, the dissociation cell/laser diode array systems of the present invention are capable of providing a high density photon flux along an extended portion of the ion beam.

Figure 1:
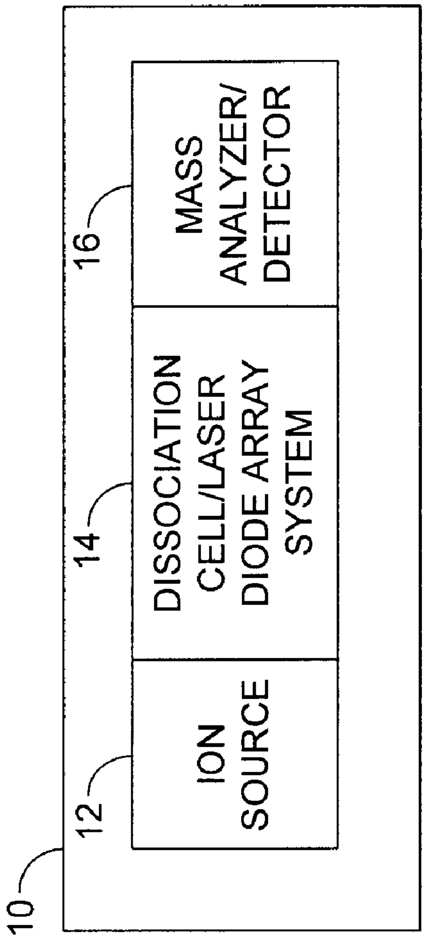
FIG. 1 is a block diagram illustrating a representative embodiment of a mass spectrometer system having a dissociation cell/laser diode array system of the present invention.

FIG. 1 is a block diagram that illustrates a mass spectrometry system 10 that includes an ion source 12, a dissociation cell/laser diode array system 14, and a mass analyzer/detector 16. The dissociation cell/laser diode array system 14 can include a radio frequency (RF) multipole assembly (e.g., quadrupole mass assembly, hexapole mass assembly, and octopole mass assembly) and one or more laser diode array systems, which will be described in more detail below.

The ion source 12 is typically a device capable of forming ions from a sample to be analyzed. The ion source 12 can be any appropriate mass spectrometry ion source appropriate for the particular application such as, for example, an electrospray source, a photoionization source, a matrix assisted laser desorption ion source, an electron beam ionization source (i.e., continuous or pulsed), an atmospheric pressure chemical ionization source, and a plasma source.

The mass analyzer/detector 16 can include a mass analyzer and a detector. The mass analyzer can include, for example, a time-of-flight (TOF) mass analyzer, an ion trap, a quadrupole mass analyzer, a magnetic sector mass analyzer, and an ion cyclotron resonance (ICR) mass analyzer.

The detector is a device for recording ions that are subjected to acceleration and deflection forces in mass spectrometry system, as is known in the art. The detector can include, for example, an electron multiplier detector, a channel electron multiplier detector, a microchannel plate multiplier detector, and a gas electron multiplier detector.

It should be noted that the mass spectrometry system 10 shown in FIG. 1 does not illustrate ion optic systems, mass spectrometry pumping equipment (e.g., turbo molecular pumps or oil diffusion pumps), mass spectrometry electronic components (e.g., power supplies), and the like. However these are known in the art and are often tailored for specific mass spectrometry systems.

Figure 2:
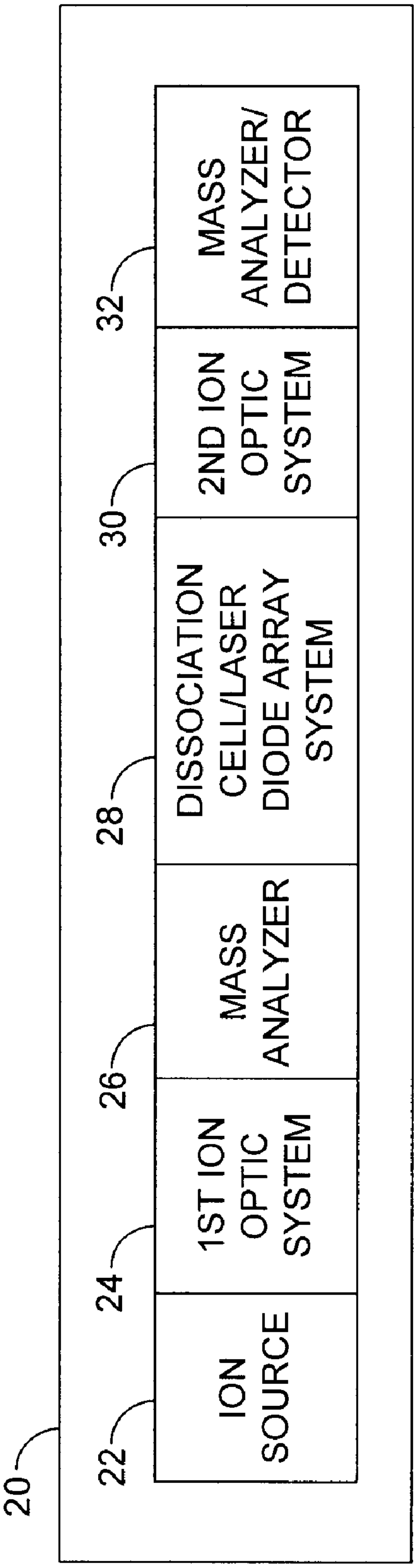
FIG. 2 is a block diagram illustrating another representative embodiment of a mass spectrometer system having a dissociation cell/laser diode array system of the present invention.

FIG. 2 is a block diagram that illustrates a mass spectrometry system 20 that includes a dissociation cell/laser diode array system 28. The mass spectrometry system 20 includes an ion source 22, a first ion optic system 24, a mass analyzer 26, a dissociation cell/laser diode array system 28, a second ion optic system 30, and a mass analyzer/detector 32. The ion source 22, the dissociation cell/laser diode array system 28, and the mass analyzer/detector 32 are analogous to the ion source 12, the dissociation cell/laser diode array system 14, and the mass analyzer/detector 16 shown in FIG. 1. The mass analyzer 26 is typically a quadrupole mass analyzer, however, other mass analyzers, such as those described above, may be used in particular mass spectrometry configurations.

The ion optic systems 24 and 30 can be used for transmitting ions and manipulating a beam of ions. In particular, the ion optic systems 24 and 30 can, for example, focus or defocus a beam of ions. In addition, the ion optic systems 24 and 30 can alter ion energy and the ion beam energy distribution.

Generally, the ion optic systems 24 and 30 can be divided into two categories. In category one, the ion optic systems 24 and 30 use magnetic fields or electrostatic fields in various configurations such as, for example, an electrostatic einzel lens system and an electrostatic or a magnetic sector field system, and a multipole lens system. In category two, the ion optic systems 24 and 30 use a radio frequency electrical field such as that employed in RF multipole ion guides and RF ion funnels, which use of a series of ring electrodes.

Figure 3:
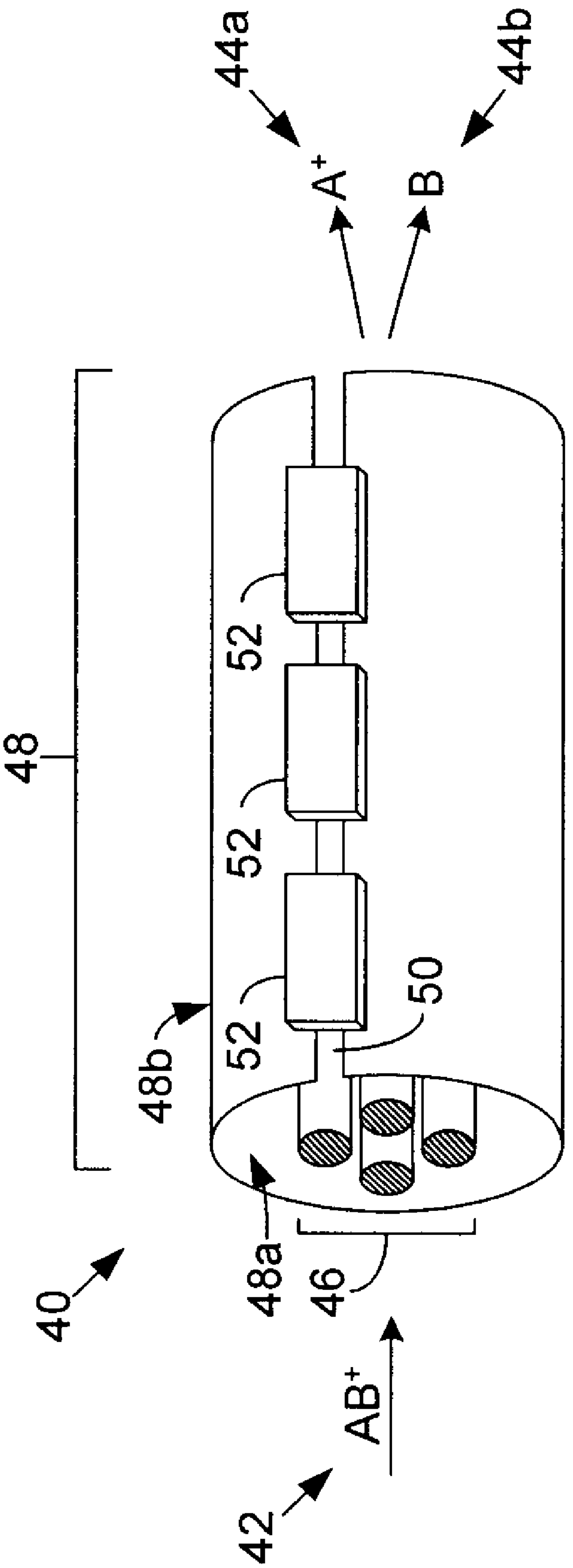
FIG. 3 is a perspective view of a dissociation cell/laser diode array system of the present invention.

FIG. 3 is a perspective view of a dissociation cell/laser diode array system 40. The dissociation cell/laser diode array system 40 can be used in a mass spectrometry system to photodissociate an ion ($AB^+$) 42 into an ion ($A^+$) 44*a* and a neutral molecule (B) 44*b*.

One embodiment of the dissociation celulaser diode array system 40 includes a quadrupole structure 46, an inner structure 48, and three laser diode array systems 52. The inner structure 48 substantially surrounds the quadrupole structure 46, while the three laser diode array systems 52 are disposed upon the outer surface 48*b* of the inner structure 48.

Figure 4A:
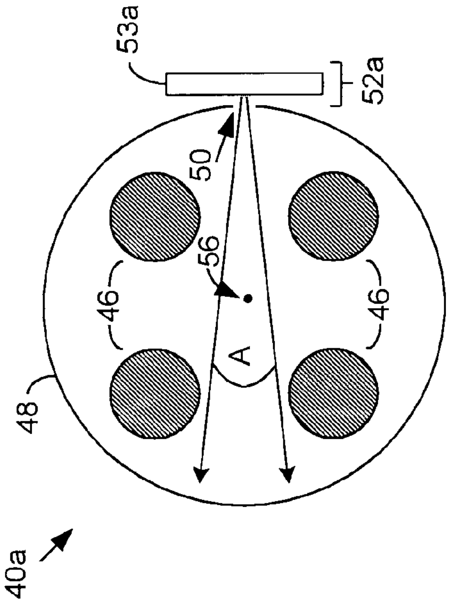
FIG. 4A is a cross-sectional view of an embodiment of a laser diode array system used in the dissociation cell/laser diode array system shown in FIG. 3.
Figure 4C:
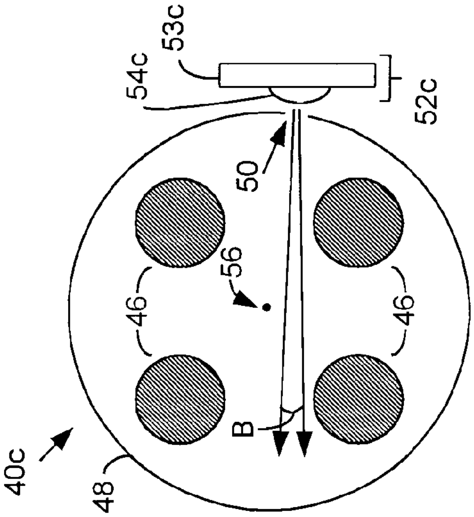
FIG. 4C is a cross-sectional view of another embodiment of another laser diode array system used in the dissociation cell/laser diode array system shown in FIG. 3, in which the laser diode array system is aligned off-axis relative to the central longitudinal axis of the mass analyzer.
Figure 4B:
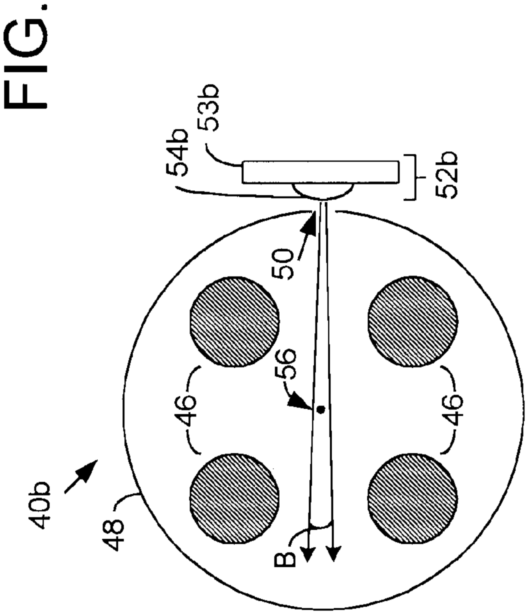
FIG. 4B is a cross-sectional view of another embodiment of another laser diode array system used in the dissociation cell/laser diode array system shown in FIG. 3, in which the laser diode array system includes a lens system.

The quadrupole structure 46 is a conventional electric RF multipole ion guide that is constructed of four circular electrically conductive rods of substantially the same geometric dimension. The rods are parallel to a central longitudinal axis 56, and each rod is located a fixed distance from the central longitudinal axis 56 (as shown in FIGS. 4A through 4C). When radio frequency voltages of opposite polarities are alternately applied to the adjacent rods, a symmetric RF field is established inside the area defined by the rods. At any cross section of the symmetric RF quadrupole field, the potential distribution is a function of time and is characterized by the RF frequency. Other embodiments can include a RF multipole ion guide having a larger even number of rods (e.g., six rods or eight rods). RF multipole ion guides and the corresponding electronic components are known in the art.

The inner structure 48 substantially surrounds the quadrupole structure 46, as shown in FIG. 3. The inner structure 48 extends the length of the quadrupole structure 46. However, the length of the inner structure 48 may be longer or shorter than the quadrupole structure 46, as can be determined by one skilled in the art for a particular application. FIG. 3 illustrates the inner structure 48 as a cylinder; however, the inner structure 48 can have an elliptical or a polygonal shape to effect focusing of the laser radiation to an intense region coaxial with the inner structure 48 axis and thus form an optical cavity.

In the preferred embodiment, the inner surface 48*a* of the inner structure 48, the surface facing the quadrupole structure 46, is a highly internally optic-reflective surface that can reflect the laser radiation. Typically, the inner structure 48 is made of a material (e.g., stainless steel, aluminum or fused quartz) that is not highly internally optic-reflective. Therefore, the inner surface 48*a* of the inner structure 48 can be polished or coated with a highly internally optic-reflective material such as, for example, a reflective metal (e.g., gold or aluminum), a reflective stack of dielectric layers of material (e.g., zinc sulfide (ZnS), and cryolite). Alternatively, an absorptive coating (e.g., "black gold") can be applied if reflection is not desired (i.e., an optic absorptive surface).

In a preferred embodiment, the inner structure 48 has a diameter of about 5 to 25 millimeters and a length of about 50 to 150 millimeters. The inner structure 48 has a wall thickness of about 0.25 to 1.0 millimeters. The inner structure 48 includes the opening 50 along the longitudinal axis of the quadrupole structure 46. The opening 50 extends the length of the inner structure 48. However, the opening 50 may extend a shorter distance than the length of the inner structure 48.

In another embodiment of the inner structure 48, the opening 50 can be represented as a slot or multiple slots through which laser radiation can pass. One or more laser diode array systems, described below, can be associated with the slot or slots. Preferably, a single laser diode array system is associated with a single slot, so that the number of slots equals the number of laser diode array systems. The slots can be located on any portion of the inner structure 48.

In another embodiment, the opening 50 can be covered by a transparent material. The transparent material can be made of any material that laser radiation can pass through such as, for example, glass, fused quartz, and or a polymer. In addition, the transparent material can act as a lens system that focuses or defocuses the laser radiation.

FIGS. 4A through 4C are cross-sectional views illustrating three different laser diode array system configurations that can be used in the dissociation cell/laser diode array system 40 shown in FIG. 3. FIG. 4A is a cross-sectional view of a laser diode array system 52*a* used in the dissociation cell/laser diode array system 40*a*, wherein the cross-section is taken along the laser diode array system 52*a* perpendicular to the central longitudinal axis 56.

The laser diode array system 52*a* shown in FIG. 4A includes a laser diode array 53*a*. The laser diode array 53*a* is composed of many individual semiconductor lasers stacked side-by-side on a common substrate. The laser diode array 53*a* emits a "ribbon" shaped beam of laser radiation that passes through the opening 50 of the inner structure 48 and can be absorbed by an ion causing the ion to photodissociate. Alternatively, the laser radiation can be internally reflected on the inside surface 48*a* of the inner structure 48.

In this embodiment, the laser radiation is emitted at about a 40° angle, as shown by arrow A, by the laser diode array 53*a*. In addition, the opening 50 is aligned on-axis with the central longitudinal axis 56 of the quadrupole structure 46. In general, the ion beam (not shown) is concentrated along the central longitudinal axis 56 of the quadrupole structure 46, so that on-axis alignment may increase the probability of photodissociation of the ions.

The wavelength of the laser radiation emitted from the laser diode array 53*a* can be any wavelength that causes the desired photodissociation. For example, the laser diode array 53*a* (available from Cutting Edge Optronics Incorporated) can emit laser radiation having wavelengths of 795 nanometers, 808 nanometers, 1450 nanometers, 1540 nanometers, and the like. Selection of a laser diode array having a particular wavelength depends upon the type of bond that needs to be broken, which can be determined by one skilled in the art.

FIG. 4B is a cross-sectional view of another laser diode array system 52*b* used in the dissociation cell/laser diode array system 40*b*, wherein the cross-section is taken along the laser diode array system 52*b* perpendicular to the central longitudinal axis 56. In this embodiment, the laser diode array system 52*b* includes the laser diode array 53*a* and a lens system 54*b*. The lens system 54*b* focuses the laser radiation emitted from the laser diode array 53*b* so that the laser radiation has about a 1° angle, as shown by arrow B. Since the ion beam is concentrated along the central longitudinal axis 56 of the quadrupole structure 46, focusing the laser radiation onto the longitudinal central axis 56 enhances the probability of photodissociation of the ions.

FIG. 4C is a cross-sectional view of another laser diode array system 52*c* used in the dissociation cell/laser diode array system 40*c*, wherein the cross-section is taken along the laser diode array system 52*c* perpendicular to the central longitudinal axis 56.

The laser diode array system 52*c* is aligned off-axis relative to the central longitudinal axis 56 of quadrupole structure 46. By aligning the laser diode array system 52*c* offaxis, the laser radiation is less likely to be reflected back to the opening 50. It should be noted that the internal reflection of the laser radiation within the inner structure 48 might be altered by using inner structures having different geometric shapes, as discussed above. Alternatively, an absorptive coating (e.g., "black gold") can be applied if reflection is not desired (i.e., an optic absorptive surface).

FIG. 3 illustrates three laser diode array systems for demonstrative purposes and one or more laser diode array systems 52 can be used in a dissociation cell/laser diode array system in accordance with this embodiment of the invention. In addition, multiple rows of laser diode array systems can be included in a dissociation cell/laser diode array system. Furthermore, a dissociation cell/laser diode array system can include laser diode array systems that can emit laser radiation having different wavelengths (i.e., laser diode arrays emitting laser radiation at 795 nanometers and 1540 nanometers).

The laser diode array system 52 can be operated in a continuous mode or in a pulsed mode. In the preferred embodiment, the laser diode array system 52 is operated in a pulsed mode to lessen the heat generated by the laser diode array system 52 and match the duty cycle of the associated mass spectrometer.

In general, the laser diode array system 52 can include a laser diode array and a lens system. In addition, the laser diode array system 52 can include one or more lenses.

The dissociation cell/laser diode array system 40 can be used in conjunction with a dissociation gas (i.e., collision-induced dissociation). In this embodiment, the ions can be photodissociated or collisionally dissociated or a combination thereof In addition, inert gas can be used to collisionally cool the ions, so that the ion beam narrows. Collisional cooling of the ion beam toward the central longitudinal axis 56 of the quadrupole structure 46 can be useful since the laser radiation can be focused toward the central longitudinal axis 56, as is discussed in regard to FIGS. 4B and 4C.

Figure 5:
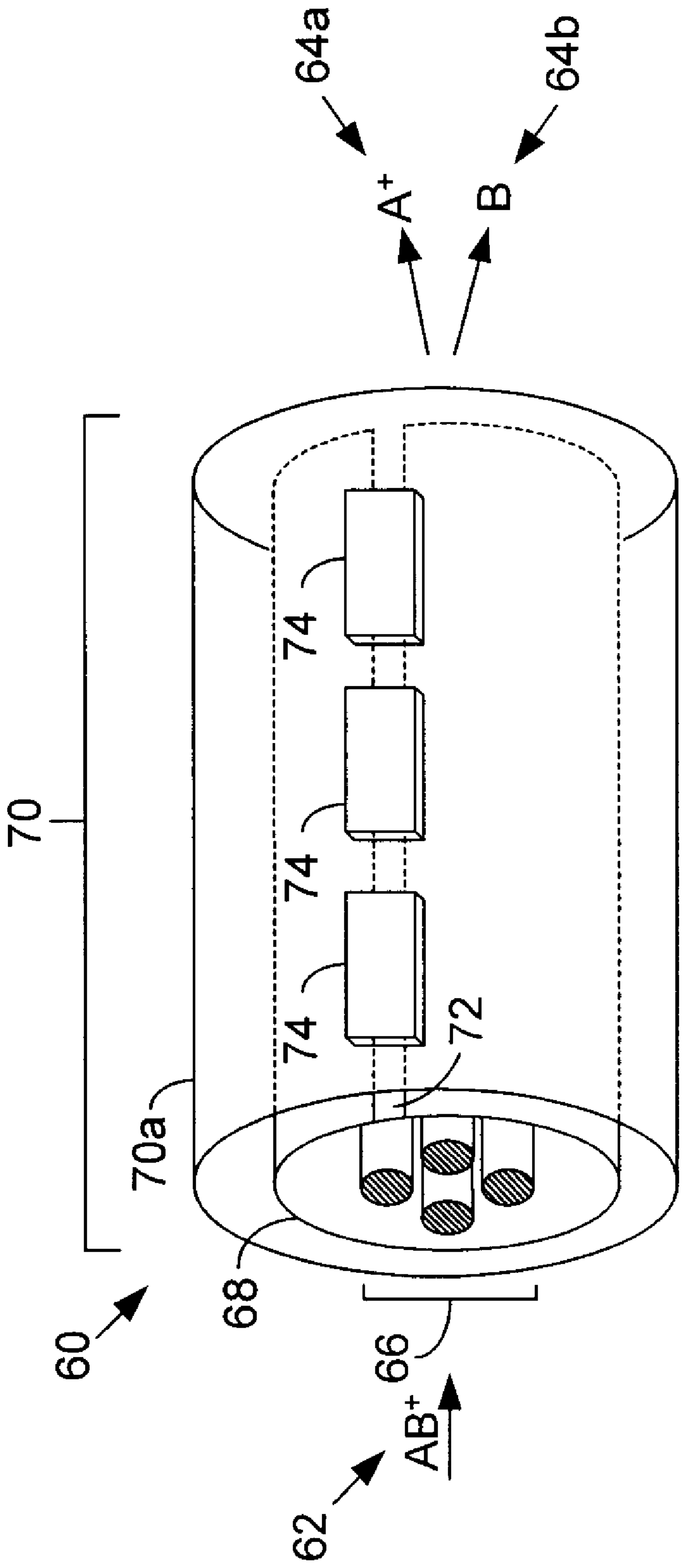
FIG. 5 is a side perspective view of another dissociation cell/laser diode array system of the present invention, in which the laser diode array system is located adjacent an outer structure.

FIG. 5 is a perspective view of a mass spectrometer/laser diode array system 60. The dissociation cell/laser diode array system 60 can be used in a mass spectrometry system to photodissociate an ion ($AB^+$) 62 into an ion ($A^+$) 64A and a neutral molecule (B) 64B.

One embodiment of dissociation cell/laser diode array system 60 includes a quadrupole structure 66, an inner structure 68, an outer structure 70, and three laser diode array systems 74. The inner structure 68 substantially surrounds the quadrupole structure 66, while the outer structure 70 substantially surrounds the inner structure 68 and may serve, with suitable end caps, to contain a dissociation gas. The laser diode array systems 74 are disposed adjacent the outer surface 70*a* of outer structure 70 and would serve as gas seals for openings (not shown) corresponding to the laser diode array systems 74.

The quadrupole structure 66 is a conventional electric RF multipole ion guide comparable to the quadrupole structure 46 discussed in reference to FIG. 3. In addition, the inner structure 68 and the laser diode array systems 74 are comparable to the inner structure 48 and the laser diode array systems 52, discussed in reference to FIG. 3.

The outer structure 70 substantially surrounds the inner structure 68 and the quadrupole structure 66, as shown in FIG. 5. The outer structure 70 extends the length of the inner structure 68 and the quadrupole structure 66. However, the length of the outer structure 70 may be longer or shorter than the inner structure 68 and/or the quadrupole structure 66, as can be determined by one skilled in the art for a particular application. FIG. 5 illustrates the outer structure 70 as a cylinder; however, the outer structure 70 can have an elliptical or polygonal shape.

Typically, the outer structure 70 can be made of a material such as, for example, stainless steel, or aluminum. In addition, the outer structure 70 can be made of a non-metallic material such as, for example, ceramic or polymer.

In this embodiment, the outer structure 70 has a diameter of about 30 to 75 millimeters, a length of about 50 to 300 millimeters, and a wall thickness of about 1 to 2 millimeters.

Figure 6B:
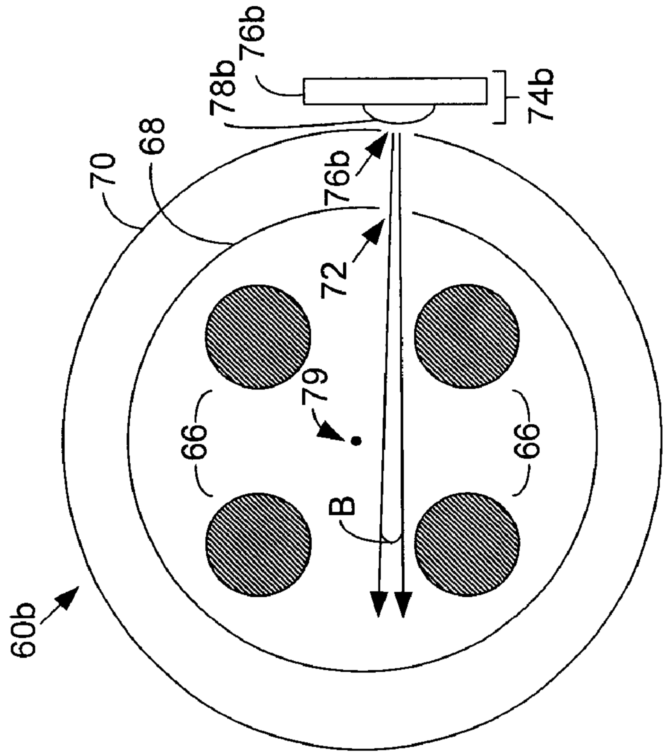
FIG. 6B is a cross-sectional view of an embodiment of the dissociation cell/laser diode array system shown in FIG. 5, in which the laser diode array system is aligned off-axis relative to the central longitudinal axis of the mass analyzer.
Figure 6A:
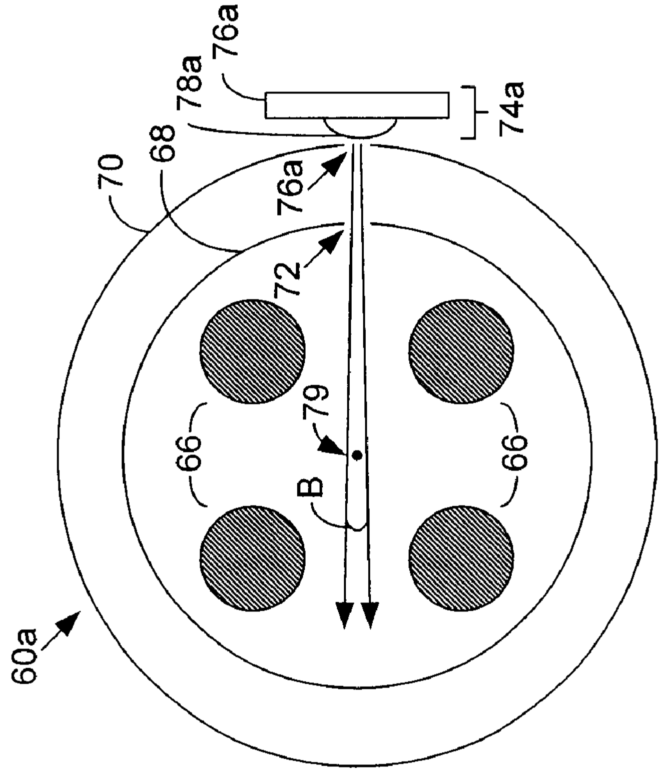
FIG. 6A is a cross-sectional view of an embodiment of the dissociation cell/laser diode array system shown in FIG. 5, in which the laser diode array system includes a lens system.

The outer structure 70 includes three outer structure openings that correspond to the three laser diode array systems 74. The outer structure openings are aligned with the opening 72 of the inner structure 68 so that laser radiation can pass through the outer structure openings and opening 72, as shown in FIGS. 6A and 6B.

The outer structure openings can be any length or width such that the laser radiation can be emitted through the outer structure openings. In addition, outer structure openings can be located on any position of the outer structure 68 so long as the laser radiation can be directed through an opening in the inner structure 68.

In the embodiment shown in FIG. 5, the opening 72 does not have the same dimensions as the outer structure openings, however, the dimensions of the outer structure openings and the opening 72 should be chosen so that the laser radiation can pass through both the outer structure openings and the opening 72. Thus, various configurations (e.g., dimensions, position, and shapes) of the outer structure openings and the opening 72 can be used with the dissociation cell/laser diode array system 60.

In another embodiment, the outer structure openings are covered with a transparent material. The transparent material can be made of any material that laser radiation can pass through such as, for example, glass, fused quartz or a polymer. In addition, the transparent material can act as a lens system that focuses or defocuses the laser radiation.

The dissociation cell/laser diode array system 60 can be used in conjunction with a dissociation gas (i.e., collision-induced dissociation) or an ion cooling gas as described above and in the dissociation celulaser diode array system 40 discussed in reference to FIG. 3.

FIGS. 6A and 6B are cross-sectional views illustrating two different laser diode array system configurations used in the dissociation celulaser diode array system 60 shown in FIG. 5. FIG. 6A is a cross-sectional view of a laser diode array system 74*a* used in the dissociation celulaser diode array system 60*a*, wherein the cross-section is taken along the laser diode array system 74*a* perpendicular to the central longitudinal axis 79.

In this embodiment, the laser diode array system 74*a* includes the laser diode array. 76*a* and the lens system 78*a*. The lens system 78*a* focuses the laser radiation emitted from laser diode array 76*a* so that the laser radiation has about a 11 angle, as shown by arrow B. The laser radiation is focused through the outer structure opening 76*a* and the inner structure opening 72 toward the central longitudinal axis 79 of the quadrupole structure 66. Since the ion beam is concentrated along the central longitudinal axis 79, focusing the laser radiation onto the central longitudinal axis 79 enhances the probability of photodissociation of the ions.

The laser diode array system 74*a* can include one or more lenses 78*a* to focus the laser radiation. As shown in FIG. 6A, the lenses can be located adjacent laser diode array 76*a* disposed on the outer structure 68. In addition, the lenses can be separated from the laser diode array 76*a*. For example, a first lens system can be located adjacent outer structure 70, while a second lens system is located adjacent the inner structure 68.

FIG. 6B is a cross-sectional view of a laser diode array system 74*b* used in the dissociation cell/laser diode array system 60*b* along the laser diode array system 74*b*.

The laser diode array system 74*b* is aligned off-axis relative to the central longitudinal axis 79 of the quadrupole structure 66. The laser radiation is focused through the outer structure opening 76*b* and the inner structure opening 72 toward the central longitudinal axis 79 of the quadrupole structure 66. By aligning the laser diode array system 74*b* off-axis, the laser radiation is less likely to be reflected back to the opening 72. It should be noted that the internal reflection of the laser radiation within the inner structure 68 might be altered by using an inner structure having different geometric shapes, as discussed above. Alternatively, an absorptive coating (e.g., "black gold") can be applied if reflection is not desired (i.e., an optic absorptive surface).

Figure 7A:
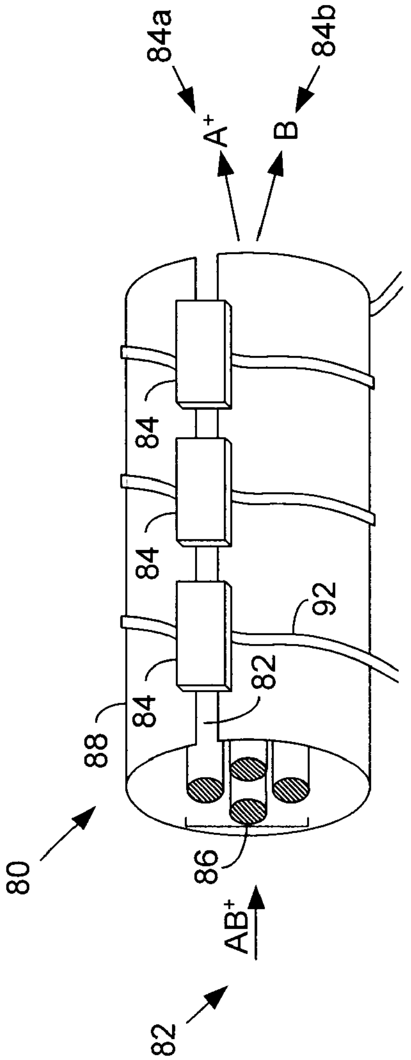
FIG. 7A is a side perspective view of a dissociation cell/laser diode array system of the present invention, in which the power cable of the laser diodes is wound helically around the inner structure.

FIG. 7A is a perspective view of a dissociation cell/laser diode array system 80 in which a power conductor (i.e., cord) 92 of the laser diode array systems 84 is wound helically around the inner structure 88. Winding the power conductor 92 helically around the inner structure 88 produces an axial magnetic field when current passes through the power conductor 92. The magnetic field produces a "magnetic bottle" effect that constrains the ions along the central longitudinal axis (not shown) of the quadrupole structure 86. This can be advantageous because the laser radiation is focused along the central longitudinal axis of the quadrupole structure 86, thus enhancing the probability of photodissociation of the ions and facilitating the confinement of the fragment ions.

Figure 7B:
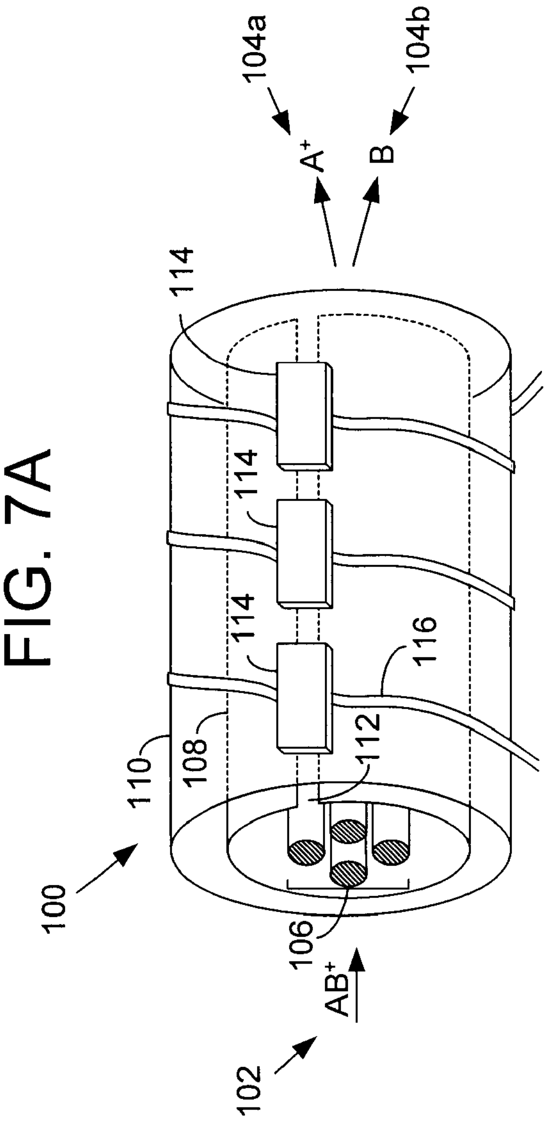
FIG. 7B is a side perspective view of another embodiment of a dissociation cell/laser diode array system of the present invention, in which the power cable of the laser diode array system is wound helically around the outer structure.

FIG. 7B is a side perspective view of another dissociation cell/laser diode array system 100 in which a power conductor 116 of the laser diode array systems 114 is wound helically around the outer structure 110. Winding the power conductor 116 helically around the outer structure 110, when the outer structure 110 is not ferro-magnetic, produces an axial magnetic field when current passes through the power conductor 116. The magnetic field produces a "magnetic bottle" effect that constrains the ions along the central longitudinal axis (not shown) of the quadrupole structure 106. This can be advantageous because the laser radiation is focused along the central longitudinal axis of the quadrupole structure 106, thus enhancing the probability of photodissociation of the ions.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

Therefore, having thus described the invention, at least the following is claimed:

1. A mass spectrometry system, comprising:

a radio frequency multipole assembly;

an inner structure having an outer surface, an inner surface, and an opening, wherein the inner structure substantially surrounds the radio frequency multipole assembly; and a laser diode array system disposed on the outer surface of the inner structure adjacent the opening such that laser radiation emitted from the laser diode array system travels through the opening.

2. The mass spectrometry system of claim 1, wherein the inner surface of the inner structure is optic-reflective.

3. The mass spectrometry system of claim 2, wherein the inner surface of the inner structure is coated with a material selected from an optic-reflective metal and an optic-reflective dielectric material.

4. The mass spectrometry system of claim 1, wherein the inner surface of the inner structure is optic-absorptive.

5. The mass spectrometry system of claim 1, wherein the radio frequency multipole assembly comprises a quadrupole structure.

6. The mass spectrometry system of claim 1, wherein the radio frequency multipole assembly is selected from a quadrupole mass analyzer, hexapole mass analyzer, and a octopole mass analyzer.

7. The mass spectrometry system of claim 1, wherein the opening includes a slot.

8. The mass spectrometry system of claim 1, wherein the opening extends the length of the inner structure.

9. The mass spectrometry system of claim 1, wherein the laser diode array system includes a laser diode array.

10. The mass spectrometry system of claim 1, wherein the laser diode array system includes a laser diode array and a lens system.

11. The mass spectrometry system of claim 1, wherein the laser diode array system operates in a pulsed mode.

12. The mass spectrometry system of claim 1, further comprising a power conductor associated with the laser diode array system, the power conductor wound helically around the inner structure producing an axial magnetic field when current passes through the power conductor.

13. A mass spectrometry system, comprising:

a radio frequency multipole assembly;

an inner structure having a first side opening, wherein the inner structure substantially surrounds the radio frequency multipole assembly;

a outer structure having a second side opening, wherein the outer structure substantially surrounds the inner structure, and wherein the first side opening and a second side opening are substantially aligned; and a laser diode array system, wherein the laser diode array system is disposed on an outer surface of the outer structure adjacent the second side opening such that laser radiation emitted from the laser diode array system is directed through the second side opening and the first side opening.

14. The mass spectrometry system of claim 13, wherein an inner surface of the inner structure is optic-reflective.

15. The mass spectrometry system of claim 14, wherein the inner surface of the inner structure is coated with a material selected from an optic-reflective metal and an optic-reflective dielectric material.

16. The mass spectrometry system of claim 13, wherein the inner surface of the inner structure is optic-absorptive.

17. The mass spectrometry system of claim 13, wherein the radio frequency multipole assembly comprises a quadrupole structure.

18. The mass spectrometry system of claim 13, wherein the laser diode array system includes a laser diode array.

19. The mass spectrometry system of claim 13, wherein the laser diode array system includes a laser diode array and a lens system.

20. The mass spectrometry system of claim 13, further comprising a power conductor associated with the laser diode array system, the power conductor wound helically around the inner structure producing an axial magnetic field when current passes through the power conductor.

21. A mass spectrometry system, comprising:

an ion source;

a dissociation celulaser diode array system; wherein the dissociation cell/laser diode array system includes:

a radio frequency multipole assembly, a structure that substantially surrounds the radio frequency multipole assembly, and a laser diode array system disposed on the outer surface of the structure; and a mass analyzer.

22. A method of dissociating an ion, comprising:

producing the ion;

focusing the ion into a dissociation celulaser diode array system, wherein the dissociation celulaser diode array system includes a radio frequency multipole assembly, a structure that substantially surrounds the radio frequency multipole assembly, and a laser diode array system disposed on the outer surface of the structure;

producing laser radiation with a laser diode array system; and photodissociating the ion.

23. The method of claim 22, wherein the structure includes an optic-reflective inner surface and further comprising reflecting the laser radiation within the optic-reflective inner surface of the structure.

24. The method of claim 22, wherein the structure includes an optic-reflective inner surface.

25. The method of claim 22, further comprising focusing the laser radiation with a lens system.

* * * * *